(12) United States Patent
Nakagawa

(10) Patent No.: US 11,383,548 B2
(45) Date of Patent: Jul. 12, 2022

(54) TRANSFER SHEET, DESIGN PRODUCT, AND METHOD OF MANUFACTURING DESIGN PRODUCT

(71) Applicant: KAWASAKI MOTORS, LTD., Akashi (JP)

(72) Inventor: Fumihiro Nakagawa, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/108,921

(22) Filed: Dec. 1, 2020

(65) Prior Publication Data

US 2021/0162800 A1 Jun. 3, 2021

(30) Foreign Application Priority Data

Dec. 3, 2019 (JP) .............................. JP2019-218878

(51) Int. Cl.
| | |
|---|---|
| *B44C 1/175* | (2006.01) |
| *C09J 7/29* | (2018.01) |
| *C09J 7/32* | (2018.01) |
| *B41M 3/12* | (2006.01) |
| *B05D 7/00* | (2006.01) |
| *B41M 1/12* | (2006.01) |

(52) U.S. Cl.
CPC .............. *B44C 1/1758* (2013.01); *B05D 7/57* (2013.01); *B41M 1/12* (2013.01); *B41M 3/12* (2013.01); *C09J 7/29* (2018.01); *C09J 7/32* (2018.01); *C09J 2301/122* (2020.08); *Y10T 428/14* (2015.01)

(58) Field of Classification Search
CPC .......... B44C 1/1758; B05D 7/57; B05D 5/06; B05D 7/53; B05D 1/286; B41M 1/12; B41M 3/12; C09J 7/29; C09J 7/32; C09J 2301/122; Y10T 428/14
See application file for complete search history.

(56) References Cited

U.S. PATENT DOCUMENTS

| | | | | | |
|---|---|---|---|---|---|
| 1,968,394 | A | * | 7/1934 | Hepp ..................... | B44C 1/175 |
| | | | | | 428/343 |
| 2,374,323 | A | * | 4/1945 | Bihr ...................... | B44C 1/1752 |
| | | | | | 40/543 |
| 2,567,067 | A | * | 9/1951 | Grupp .................. | B44C 1/1733 |
| | | | | | 428/41.6 |
| 2,629,670 | A | * | 2/1953 | Rathke ................. | B44C 1/1756 |
| | | | | | 428/41.5 |
| 3,344,012 | A | * | 9/1967 | AF Strom ............ | B44C 1/1725 |
| | | | | | 428/126 |
| 4,399,177 | A | * | 8/1983 | Ozasa ................... | B44C 1/175 |
| | | | | | 428/199 |

FOREIGN PATENT DOCUMENTS

JP 2002284125 A 10/2002

* cited by examiner

*Primary Examiner* — Patricia L. Nordmeyer
(74) *Attorney, Agent, or Firm* — Alleman Hall Creasman & Tuttle LLP

(57) ABSTRACT

A transfer sheet includes a base sheet and a transfer body. The transfer body includes a liquid-soluble adhesive layer and a liquid-insoluble sheet main body layer laminated on the liquid-soluble adhesive layer. The sheet main body layer includes a sticking layer adjacently laminated on the adhesive layer and a design layer adjacently laminated on the sticking layer. The sticking layer includes a protruding portion protruding outward beyond an end edge of the design layer. The protruding portion is transparent.

11 Claims, 4 Drawing Sheets

TRANSFER SHEET, DESIGN PRODUCT, AND METHOD OF MANUFACTURING DESIGN PRODUCT

CROSS REFERENCE TO RELATED APPLICATION

This application claims priority to and the benefit of Japanese Patent Application No. 2019-218878 filed on Dec. 3, 2019, the entire disclosure of which is incorporated herein by reference.

BACKGROUND OF THE INVENTION

Field of the Invention

The present disclosure relates to a transfer sheet, a design product, and a method of manufacturing a design product.

Description of the Related Art

In some cases, a transfer sheet is used to impart a design to a base (see Japanese Laid-Open Patent Application Publication No. 2002-284125, for example). Moreover, in some cases, in the transfer sheet, in order to increase a sticking property of a design layer which is stuck to the base to impart the design to the base, a sticking layer is formed between the base and the design layer of the transfer sheet.

In a step of manufacturing the transfer sheet, the design layer slightly deviates from a sticking hiding layer due to influence of manufacturing accuracy in some cases. In this case, a positioning error portion, which deviates from the sticking hiding layer, of the design layer directly adheres to the base without through the sticking hiding layer. Since the sticking property of the positioning error portion with respect to the base is weak, this tends to become the cause of a defect.

SUMMARY OF THE INVENTION

A transfer sheet according to one aspect of the present disclosure includes a base sheet and a transfer body laminated on the base sheet. The transfer body includes a liquid-soluble adhesive layer laminated on the base sheet and a liquid-insoluble sheet main body layer laminated on the liquid-soluble adhesive layer. The sheet main body layer includes a sticking layer adjacently laminated on the adhesive layer at an opposite side of the base sheet and having a function of sticking the sheet main body layer to a sticking target object and a design layer adjacently laminated on the sticking layer at an opposite side of the adhesive layer. The sticking layer includes a protruding portion protruding outward beyond an end edge of the design layer. The protruding portion is transparent.

According to the above configuration, since the sticking layer protrudes outward beyond the end edge of the design layer, the end edge of the design layer is prevented from directly adhering to the base as the sticking target object without through the sticking layer. Therefore, the sticking property is satisfactorily maintained, and defects due to a decrease in the sticking property can be prevented. Moreover, since the protruding portion of the sticking layer is transparent, the base itself can be seen from an outside through the protruding portion. On this account, the protruding portion of the sticking layer can be prevented from becoming conspicuous, and the deterioration of the appearance due to the protruding portion can be prevented. Thus, both the sticking property and the appearance can be realized in the transfer sheet, and the defects of the transfer sheet can be suitably prevented.

A design product according to another aspect of the present disclosure includes: a base as a sticking target object; a sheet main body layer of a transfer sheet which is stuck to the base; and a clear coat layer painted on both a surface of the sheet main body layer and a surface of a portion of the base, the portion of the base being located around the sheet main body layer. The sheet main body layer includes a sticking layer provided on a surface, close to the base, of the sheet main body layer to improve a sticking property of the sheet main body layer with respect to the base and a design layer adjacently laminated on the sticking layer at an opposite side of the base. The sticking layer includes a protruding portion protruding outward beyond an end edge of the design layer. The protruding portion is configured to be seen in a color that is same as a surface color of the base when the sheet main body layer is being stuck to the base.

According to the above configuration, both the sticking property of the sheet main body layer with respect to the base and the appearance of the design product can be realized.

A method of manufacturing a design product according to yet another aspect of the present disclosure includes: preparing a transfer sheet including a sheet main body layer formed by laminating a sticking layer, a design layer, and a clear layer in this order from a side where a base is provided, the sticking layer including a protruding portion protruding outward beyond an end edge of the design layer, the protruding portion being transparent; applying a liquid to the transfer sheet and sticking the sheet main body layer to a predetermined position of the base; and drying in a drying furnace the base to which the sheet main body layer has been stuck.

According to the above method, the design layer is prevented from directly contacting the base. Therefore, the sticking property of the sheet main body layer with respect to the base is easily maintained, and a fluid can be easily prevented from remaining between the sheet main body layer and the base. With this, even under a high-temperature state in a drying process, the expansion of the fluid between the sheet main body layer and the base can be prevented, and detects such as wrinkles and bulges can be prevented.

DESCRIPTION OF THE PREFERRED EMBODIMENTS

Hereinafter, embodiments will be described with reference to the drawings.

Embodiment 1

A water transfer sheet according to Embodiment 1 is used as an ornament of a fuel tank of a motorcycle. The motorcycle includes a front wheel and a rear wheel. The fuel tank is arranged behind a bar-shaped handle held by a rider. A seat straddled and ridden by the rider is arranged behind the fuel tank.

In the motorcycle of the present embodiment, the fuel tank is a part exposed to an outside of a vehicle body and occupies a relatively large region of the appearance of the vehicle body. Therefore, the appearance of the fuel tank is regarded as important in many cases. In the present embodiment, the fuel tank includes a fuel tank main body and a transfer body of a below-described water transfer sheet which is stuck to part of the fuel tank main body. To be specific, the fuel tank main body is a base (sticking target object) to which the transfer body is stuck. The transfer body is stuck to the fuel tank main body, and therefore, the fuel tank becomes a design product to which a design has been imparted by the transfer body.

Arbitrary shapes, patterns, and colors are formed on the surface of the below-described transfer body by a laminated design layer. The transfer body is formed in a sheet shape having flexibility. Therefore, when the transfer body is stuck to the base, the transfer body curves and transforms along the surface shape of the base.

As above, the transfer body in which the design layer is formed in advance is stuck to the fuel tank main body, and with this, the design is formed on the fuel tank. Therefore, design forming work is easier than when the design is directly formed on the fuel tank main body by performing painting plural times. For example, the design product having two or more colors can be produced without labor such as masking. In the present embodiment, the base to which the water transfer sheet is applied is the fuel tank main body. However, the other appearance parts (such as a cowl) of the motorcycle may be used as the bases to which the water transfer sheets are applied. The base is not limited to the part of the motorcycle, and a sticking target object (such as a helmet) to which an existing water transfer sheet is stuck may be used as the base.

Figure 1:
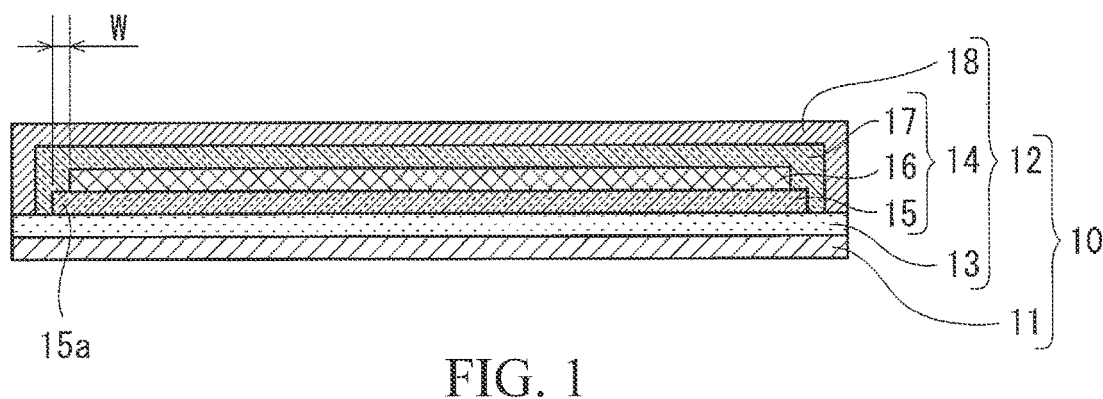
FIG. 1 is a sectional view schematically showing a water transfer sheet according to Embodiment 1.
Figure 2:
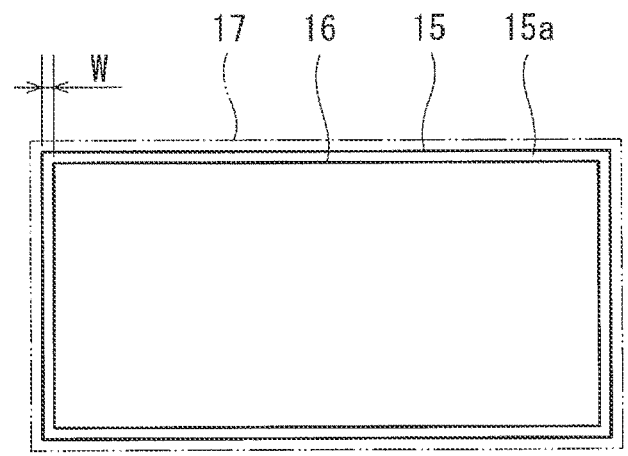
FIG. 2 is a plan view showing major layers of the water transfer sheet shown in FIG. 1.

FIG. 1 is a sectional view schematically showing a water transfer sheet 10 according to Embodiment 1. FIG. 2 is a plan view showing major layers of the water transfer sheet 10 shown in FIG. 1. As shown in FIG. 1, the water transfer sheet 10 includes a base sheet 11 and a transfer body 12 laminated on the base sheet 11. The base sheet 11 is removed from the transfer body 12 when sticking the transfer body 12 to a base 9 (fuel tank main body). The base sheet 11 is provided to protect an adhesive layer 13 of the transfer body 12 when the water transfer sheet 10 is distributed in the market. Moreover, in order to prevent the water transfer sheet 10 from deforming when the water transfer sheet 10 is distributed in the market, the base sheet 11 may be formed to have higher rigidity than the transfer body 12. The base sheet 11 is formed in a sheet shape. The base sheet 11 is, for example, a hydrophilic paper board but may be a material other than paper. The transfer body 12 corresponds to the water transfer sheet 10 from which the base sheet 11 has been removed. The transfer body 12 is stuck to the base 9 that is the sticking target object.

The transfer body 12 includes the adhesive layer 13 and a sheet main body layer 14. The transfer body 12 is formed such that the adhesive layer 13 and the sheet main body layer 14 are laminated in this order from a side where the base sheet 11 is provided. The adhesive layer 13 is a liquid-soluble resin film (for example, a water-soluble resin film) laminated on the base sheet 11 by application. The adhesive layer 13 is made of a material which realizes an adhesive property between the base 9 and the transfer body 12. For example, the adhesive layer 13 may be aqueous paste. It should be noted that the adhesive layer 13 may be made of a material which is soluble in a liquid other than water.

The sheet main body layer 14 is a liquid-insoluble (for example, water-insoluble) paint film. The sheet main body layer 14 is made of at least a material that is insoluble in a liquid in which the adhesive layer 13 is soluble. As described above, the sheet main body layer 14 is laminated on a surface of the water-soluble adhesive layer 13 at an opposite side of the base sheet 11. To be specific, the sheet main body layer 14 is adhered to the base sheet 11 through the adhesive layer 13.

The sheet main body layer 14 is a laminated structure formed by laminating a plurality of layers formed by performing an existing printing method plural times with respect to the base sheet 11 to which the adhesive layer 13 has been applied. In the present embodiment, the sheet main body layer 14 is the laminated structure formed by repeatedly performing screen printing. The screen printing is realized by the following procedure.

(1) A plate making step of making a screen mask on which an ink passing region and an ink non-passing region are formed in accordance with design (2) A printing step of making ink pass through the ink passing region (mesh) of the screen mask to selectively print the ink on a printing target object.

In the printing step, when transfer regions are changed for respective ink colors as with multicolor printing, screen masks need to be prepared for the respective ink colors, and positioning of the screen masks needs to be performed. In the printing step, a positioning error of the printing position may occur due to influence of the positioning accuracy of the screen mask.

The sheet main body layer 14 includes a sticking layer 15 and a design layer 16. In the present embodiment, the sheet main body layer 14 includes the sticking layer 15, the design layer 16, and a clear layer 17. As described above, the sheet main body layer 14 is formed such that by repeatedly performing the screen printing, the sticking layer 15, the design layer 16, and the clear layer 17 are laminated in this order on the base sheet 11 to which the adhesive layer 13 has been applied. The sticking layer 15 is a transparent resin film having a function of giving a sticking property with respect to the base 9. An outer surface of the base 9 to which the sticking layer 15 is stuck may be acryl melamine paint or acryl urethane paint. It should be noted that the clear layer 17 may be omitted.

In the present embodiment, the sticking layer 15 is realized by resin for use in the screen printing, and the resin gives the sticking property with respect to the base 9 and is constituted to be seen in a color that is the same as a surface color of the base 9. Specifically, the sticking layer 15 is realized by an ink material which transmits visible light. The sticking layer 15 is only required to be transparent to such a degree that the presence of the sticking layer 15 is inconspicuous when the sticking layer 15 is being stuck to the base 9. Therefore, the sticking layer 15 may be made of a semitransparent material, i.e., a material having a light color while having a light transmission property. For example, a material having visible light transmittance of 90% or more may be used as the material of the sticking layer 15. As above, selected as the material of the sticking layer 15 is a material which is seen in a color that is the same as the surface color of the base 9, in other words, a material which is transparent to such a degree that the sticking layer 15 is inconspicuous with respect to the surface color of the base 9. The sticking layer 15 may have a color that is the same as or similar to the color of the surface of the base.

In order to secure the sticking property of the sticking layer 15 with respect to the base 9, at least one of the following items (1) to (3) is only required to be adopted.

(1) Generating van der Waals force by subjecting a stuck surface of the base to sanding.

(2) Forming the sticking layer as a soft layer to increase adhesive force of the sticking layer by stickiness.

(3) Increasing a chemical curing action with respect to the surface of the base.

(For example, making an OH group remain on the surface of a paint film of the base and adding isocyanate to the sticking layer like a two-part curing paint.)

In the present embodiment, the above items (1) and (2) are adopted. Especially, the item (2) contributes to the securement of the sticking property.

In the present embodiment, the sticking layer 15 is made of the ink material which has higher stickiness than the ink material of the design layer 16 at least when sticking the sticking layer. For example, the ink material of the sticking layer 15 is a material softer than the ink material of the design layer 16 at least when sticking the sticking layer 15. A content rate of inorganic substances in the sticking layer 15 is set to be lower than that in the design layer 16. For example, in order to express colors, the design layer 16 contains a large amount of inorganic substances, such as brilliant materials (aluminum flakes, pearls, glass flakes, etc.) and/or pigments (mineral pigments, etc.). In the design layer 16, the inorganic substances which inhibit the sticking are dispersed in a resin film. Therefore, the flexibility of the design layer 16 is lower than that of the sticking layer 15. Since the content rate of the inorganic substances in the sticking layer 15 is set to be low, the sticking property of the sticking layer 15 is higher than that of the design layer 16.

The design layer 16 is a resin film which forms an ink layer containing pigments having a desired color(s). In the present embodiment, the design layer 16 is constituted by one or plural layers. The shape, the pattern, and/or the color are different among the respective layers constituting the design layer 16, and therefore, various designs can be realized by laminating the respective layers on each other by the screen printing. For example, a five-layer laminated structure may be formed as the design layer 16.

As shown in FIGS. 1 and 2, the sticking layer 15 includes a protruding portion 15a which protrudes outward beyond an end edge of the design layer 16 in a direction vertical to a laminating direction. Even when the positioning error of a screen printing plate occurs in a direction in which the protruding portion 15a protrudes from the design layer 16, the design layer 16 is prevented from protruding from the sticking layer 15. For example, it is preferable that when a positioning error direction in which the positioning error of the screen printing plate tends to occur is known, the protruding portion 15a of the sticking layer 15 be formed so as to protrude from the design layer 16 in at least the positioning error direction. With this, the design layer 16 highly possibly stays inside the sticking layer 15. The area of a surface, vertical to the laminating direction, of the sticking layer 15 is formed larger than the area of a surface, vertical to the laminating direction, of the design layer 16. In other words, the design layer 16 is formed in a smaller region than the sticking layer 15.

Figure 4:
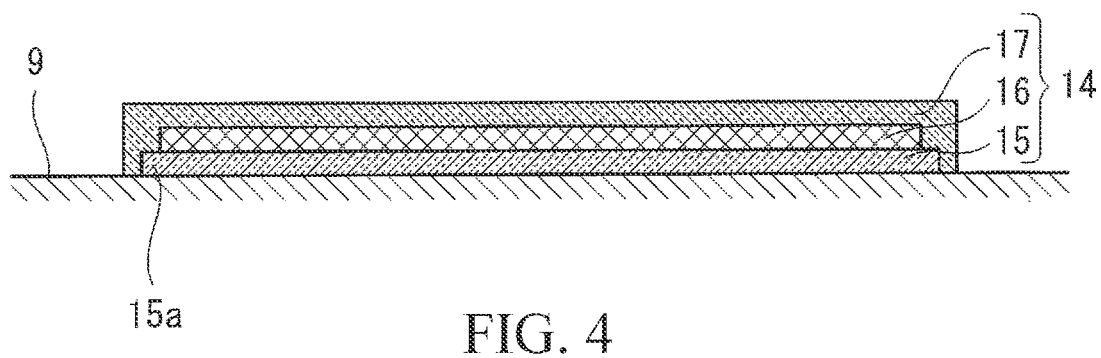
FIG. 4 is a sectional view showing that a cover coat layer is peeled off after a sheet main body layer shown in FIG. 3 is subjected to water removing work.

As shown in FIG. 4, in the present embodiment, a surface, vertical to the laminating direction, of the protruding portion 15a surrounds the surface, vertical to the laminating direction, of the design layer 16 along the end edge of the design layer 16. With this, even when the positioning error of the design layer 16 occurs due to the deviation of the screen printing plate in an arbitrary direction, the design layer 16 is easily made to stay inside the sticking layer 15, and the possibility that the design layer 16 protrudes from the sticking layer 15 can be reduced. It should be noted that the protruding portion 15a is only required to protrude from at least a part of the design layer 16, and the protruding portion 15a may partially protrude from the design layer 16.

Moreover, it is preferable that a protruding width W that is the amount of protrusion of the protruding portion 15a from the end edge of the design layer 16 be set to not less than a positioning error allowable range of the screen printing plate. For example, when the protruding width W of the protruding portion 15a surrounding the design layer 16 is set to 1 mm or more, the screen printing having a highly accurate positioning function is not required, and therefore, the manufacturing cost is easily reduced. Moreover, when the protruding width W is set to 5 mm or less, the sticking layer 15 can be prevented from increasing in size while preventing a sticking defect. For example, the protruding width W may be a width of the protruding portion 15a in a direction perpendicular to a tangential line of a peripheral edge of the design layer 16.

The protruding portion 15a of the sticking layer 15 exposed from the design layer 16 is not hidden by the design layer 16 and is visible from an outside of the design product. In the present embodiment, since the entire sticking layer 15 is transparent, the protruding portion 15a is transparent. Therefore, the protruding portion 15a transmits visible light and is seen in a color that is the same as the surface color of the base 9. With this, the protruding portion 15a is prevented from becoming conspicuous with respect to the base 9. Moreover, the protruding width W is set to 5 mm or less, i.e., the protruding width W is small. Therefore, even if the protruding portion 15a is visible, the protruding portion 15a is prevented from becoming conspicuous.

The clear layer 17 is a transparent resin film. The visible light transmittance of the clear layer 17 is set to, for example, 90% or more. The clear layer 17 is formed so as to cover the design layer 16. A surface, vertical to the laminating direction, of the clear layer 17 is formed larger than the surface, vertical to the laminating direction, of the design layer 16. In the present embodiment, the clear layer 17 is formed larger in area than the design layer 16 so as to cover the entire end edge of the design layer 16. The clear layer 17 is different from the sticking layer 15 in that an additive which achieves the sticking property and peelability with respect to a cover coat layer 18 is added to the clear layer 17. As with the sticking layer 15, the clear layer 17 has the sticking property with respect to the base 9. To be specific, the content rate of the inorganic substances in the clear layer 17 is lower than that in the design layer 16. In the present embodiment, the clear layer 17 reaches the protruding portion 15a of the sticking layer 15. The clear layer 17 covers the entire sticking layer 15 and the entire design layer 16. The cover coat layer 18 is laminated on an outer surface of the clear layer 17. The cover coat layer 18 is a resin film for protecting the sheet main body layer 14 and is finally peeled off. Therefore, the clear layer 17 has a function of improving the peelability of the cover coat layer 18. It should be noted that the clear coat layer 18 may be omitted.

As described above, the sheet main body layer 14 is a printed body realized by the ink materials of the screen printing. Therefore, connection between the ink materials of the sheet main body layer 14 in the direction vertical to the laminating direction is weak, and the sheet main body layer 14 has flexibility. Moreover, the sheet main body layer 14 is easily formed relatively thinner than when the sheet main body layer 14 is formed by laminating sheet-shaped materials.

For example, the thickness of the transfer body 12 is more than 10 μm and less than 100 μm, preferably more than 20 μm and less than 80 μm. The thickness of the sticking layer 15 is more than 1 μm and less than 10 μm, preferably more than 5 μm and less than 7 μm. The thickness of the design layer 16 is more than 5 μm and less than 50 μm.

Polyester resin, urethane resin, or the like is used in the sheet main body layer 14. The sheet main body layer 14 has flexibility. Resin, such as acryl urethane resin, epoxy resin, or urethane resin, i.e., resin that is not completely crosslinked can be used in the sheet main body layer 14. For example, thermosetting resin is used in the sheet main body layer 14. To be specific, resin to which heat by which the resin obtains curability is not being applied is used in the sheet main body layer 14, i.e., resin in which a strong crosslinked structure is not formed yet is used in the sheet main body layer 14. For example, the clear layer 17 contains urethane resin, and the sticking layer 15, the design layer 16, and the cover coat layer 18 contain polyester resin.

For example, in the sticking layer 15, the design layer 16, and the cover coat layer 18, polyester resin is used as a main agent, and other resin is mixed as an auxiliary agent. For example, acryl urethane two-part curing resin is used as the auxiliary agent. Moreover, isocyanate is used as a curing agent in some cases. For example, a mixture of the main agent and the auxiliary agent is not heated after being applied, and with this, the promotion of the crosslinking by heat is suppressed. Moreover, a blocking agent which suppresses the crosslinking reaction may be contained as the auxiliary agent. In some cases, epoxy resin is used as the main agent, and melamine resin or isocyanate is used as the auxiliary agent.

Each of glass transition temperatures (Tg) of the layers 15 to 18 is set to 0° C. to 100° C., preferably 20° C. to 80° C., more preferably 40° C. to 60° C. With this, a soft property can be given to the paint constituting the layers 15 to 18.

Figure 3:
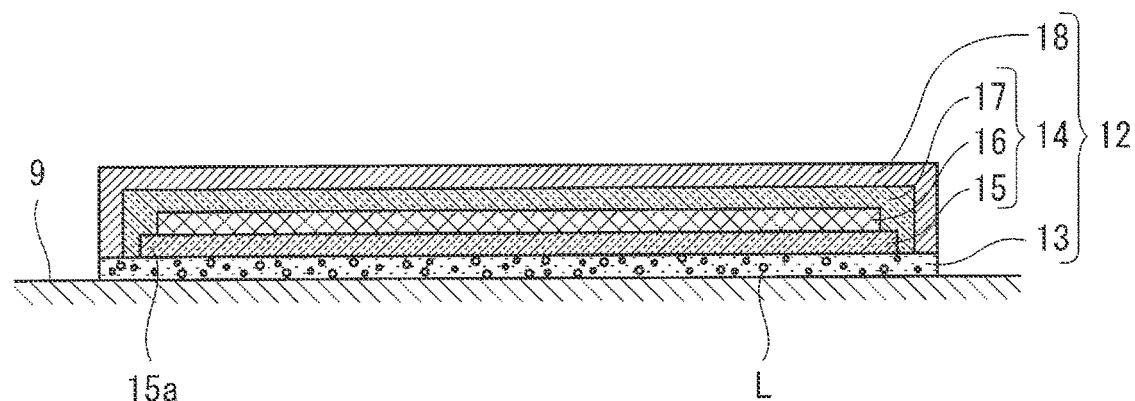
FIG. 3 is a sectional view showing that a transfer body of the water transfer sheet shown in FIG. 1 is stuck to a base.
Figure 5:
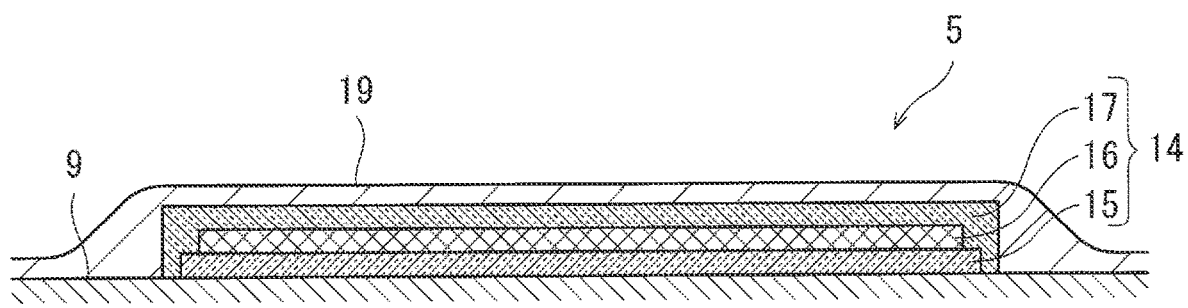
FIG. 5 is a sectional view showing that a clear coat layer is painted on the sheet main body layer and the base shown in FIG. 4.
Figure 6:
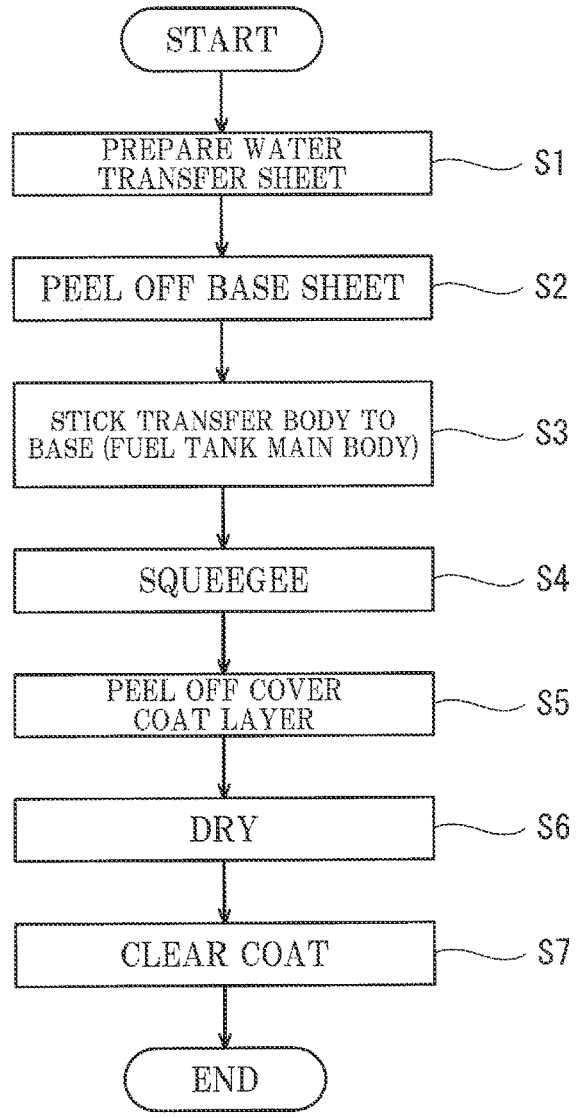
FIG. 6 is a flow chart showing a procedure of manufacturing a design product.

FIGS. 3 to 5 are sectional views for explaining work of completing the design product by sticking the transfer body 12 of the water transfer sheet 10 shown in FIG. 1 to the base 9. FIG. 6 is a flow chart showing a procedure of manufacturing the design product. Hereinafter, the procedure shown in FIG. 6 will be described with reference to FIGS. 3 to 5.

First, a preparing step is performed (Step S1). In the preparing step, the water transfer sheet 10 to be stuck to the base 9 (fuel tank main body) is prepared. The water transfer sheet 10 prepared at this time includes the sticking layer 15 including the transparent protruding portion 15a. Next, a peeling step is performed (Step S2). In the peeling step, the water transfer sheet 10 is immersed in water L, and this dissolves the water-soluble adhesive layer 13. With this, the base sheet 11 is peeled off, and the transfer body 12 is detached. Next, a sticking step is performed (Step S3; see FIG. 3). In the sticking step, the transfer body 12 including the adhesive layer 13 exposed to an outside is stuck to the stuck surface of the base 9. At this time, a final position adjustment of the sheet main body layer 14 is performed while the dissolved adhesive layer 13 remains between the base 9 and the sticking layer 15.

Next, a water removing step is performed (Step S4). In the water removing step, an outer surface of the cover coat layer 18 is rubbed with a squeegee. With this, water between the sheet main body layer 14 and the base 9 is discharged to an outside from an end edge of the sheet main body layer 14. The sheet main body layer 14 is a paint film, is low in rigidity, and is soft. Therefore, by rubbing the outer surface of the cover coat layer 18 with the squeegee, the water can be discharged, and in addition, the surface of the sheet main body layer 14 can be flattened. It should be noted that after the water removing step is completed, the adhesive layer 13 dissolved in the water is being discharged to an outside from between the base 9 and the sticking layer 15. However, the water-soluble adhesive layer 13 may remain between the base 9 and the sticking layer 15 to serve as an adhesive agent.

Next, an operator peels off and detaches the cover coat layer 18 from the clear layer 17 (Step S5; see FIG. 4). Then, a drying step is performed (Step S6). In the drying step, the base 9 to which the sheet main body layer 14 has been stuck is put in a drying furnace to be dried. After the drying, a clear coat layer 19 is painted on both the outer surface of the sheet main body layer 14 and the surface of the base 9, and thus, the design product (fuel tank) is completed (Step S7; see FIG. 5). It should be noted that after the clear coat layer 19 is painted, natural drying may be performed, or drying in the drying furnace may be performed.

According to the above-described configuration, since the sticking layer 15 protrudes outward beyond the end edge of the design layer 16, the end edge of the design layer 16 is prevented from directly adhering to the sticking target object (base 9) without through the sticking layer 15. Therefore, the sticking property of the sheet main body layer 14 with respect to the base 9 is satisfactorily maintained, and defects caused by the decrease in the sticking property can be prevented. Since the decrease in the sticking property is prevented, water and air which have entered between the sheet main body layer 14 and the base 9 can be easily pushed out with the squeegee, and therefore, the fluid can be easily prevented from remaining (entering again) between the sheet main body layer and the base. With this, even under a high-temperature state in a drying process, the expansion of the fluid between the sheet main body layer 14 and the base 9 can be prevented, and defects such as wrinkles and bulges can be prevented.

Moreover, since the protruding portion 15a of the sticking layer 15 is transparent, the base 9 (fuel tank main body) itself can be seen from an outside through the protruding portion 15a. Therefore, the protruding portion 15a of the sticking layer 15 can be prevented from becoming conspicuous, and the deterioration of the appearance due to the protruding portion 15a can be prevented. Therefore, both the sticking property of the sheet main body layer 14 with respect to the base 9 and the appearance of the design product can be realized, and the defects of the water transfer sheet 10 can be suitably prevented.

Moreover, the protruding portion 15a of the sticking layer 15 has such a shape as to surround the end edge of the design layer 16 along the end edge of the design layer 16. Therefore, even when the design layer 16 deviates from the sticking layer 15 in an arbitrary direction, the decrease in the sticking property can be prevented. Thus, an allowable amount of the positioning error can be increased, and the manufacturing cost can be reduced. Furthermore, the protruding portion 15a of the sticking layer 15 has the protruding width W of 1 mm or more from the end edge of the design layer 16. Therefore, even when the positioning error of the design layer 16 with respect to the sticking layer 15 occurs, the design layer 16 can be suitably prevented from protruding from the sticking layer 15.

Moreover, since the entire sticking layer 15 is transparent, the sticking layer 15 including the protruding portion 15a can be formed through a single step in the manufacture of the water transfer sheet 10, and thus, manufacturing steps can be simplified. Furthermore, the clear layer 17 covers the entire design layer 16 and reaches the protruding portion 15a of the sticking layer 15. Therefore, the design layer 16 can be surely prevented from being exposed to an outside.

Moreover, since the thickness of the transfer body 12 is more than 10 μm, the breaking, the generation of the wrinkles, and the like can be prevented in the water removing step using the squeegee. Thus, the water removing work can be facilitated. Furthermore, since the thickness of the transfer body 12 is less than 100 μm, the boundary between the transfer body 12 and its periphery after the transfer body 12 is stuck to the base 9 is inconspicuous. Curved surface followability of the transfer body 12 is good, and therefore, the appearance can be improved. In addition, the thickness of the design layer 16 is more than 5 μm, and the entire design layer 16 is stuck to the sticking layer 15. Therefore, in work of peeling off the cover coat layer 18, the end edge of the design layer 16 can be prevented from breaking together with the cover coat layer 18. Furthermore, since the thickness of the design layer 16 is less than 50 μm, the thickness of the transfer body 12 can be prevented from increasing, and the boundary between the transfer body 12 and its periphery can be prevented from becoming conspicuous.

Moreover, since the protruding portion 15a of the sticking layer 15 is formed to be transparent, the protruding portion 15a tends to be seen in a color that is the same as the surface color of the base 9 regardless of the color of the base 9. Therefore, the same water transfer sheet 10 can be used regardless of the color of the base 9, and therefore, the versatility of the water transfer sheet 10 can be improved.

Moreover, since the clear layer 17 covers the end edge of the design layer 16 and contacts the sticking layer 15, a boundary portion between the end edge of the design layer 16 and the sticking layer 15 can be filled with a transparent material, and therefore, the sticking layer 15 can be prevented from becoming conspicuous. Furthermore, since the clear layer 17 covers the sticking layer 15, a level difference formed by the end edge of the design layer 16 and the protruding portion 15a of the sticking layer 15 can be filled with the transparent material, and therefore, the sticking layer 15 can be further prevented from becoming conspicuous.

When the sheet main body layer 14 is stuck to part of the base 9 instead of the entire base 9, the boundary between the sheet main body layer 14 and the base 9 located around the sheet main body layer 14 tends to become more conspicuous than when the sheet main body layer 14 is stuck to the entire base 9. However, since the appearance can be improved as described above, the water transfer sheet 10 can be suitably used when being partially transferred to the base 9. Moreover, in the present embodiment, since the clear coat layer 19 is formed, a level difference between the sheet main body layer 14 and the base 9 can be prevented from becoming conspicuous, and therefore, the appearance can be improved.

The design product of the present embodiment is a relatively large part, such as a fuel tank. Even when the transfer body 12 is stuck to an area larger than an area from which the water can be removed by using the squeegee once, and therefore, the fluid tends to remain between the base 9 and the sheet main body layer 14, the sticking property tends to be maintained, and the water transfer sheet 10 can be suitably used. Moreover, the stuck surface of the design product of the present embodiment is a curved surface. Even when the transfer body 12 is stuck to such curved surface (especially a curved surface having non-uniform curvature), and the fluid tends to remain between the base 9 and the sheet main body layer 14, the sticking property can be easily maintained, and the water transfer sheet 10 can be suitably used. It should be noted that the transfer body 12 may be stuck to the entire surface of the base or may be stuck to a flat surface of the base.

Embodiment 2

Figure 7:
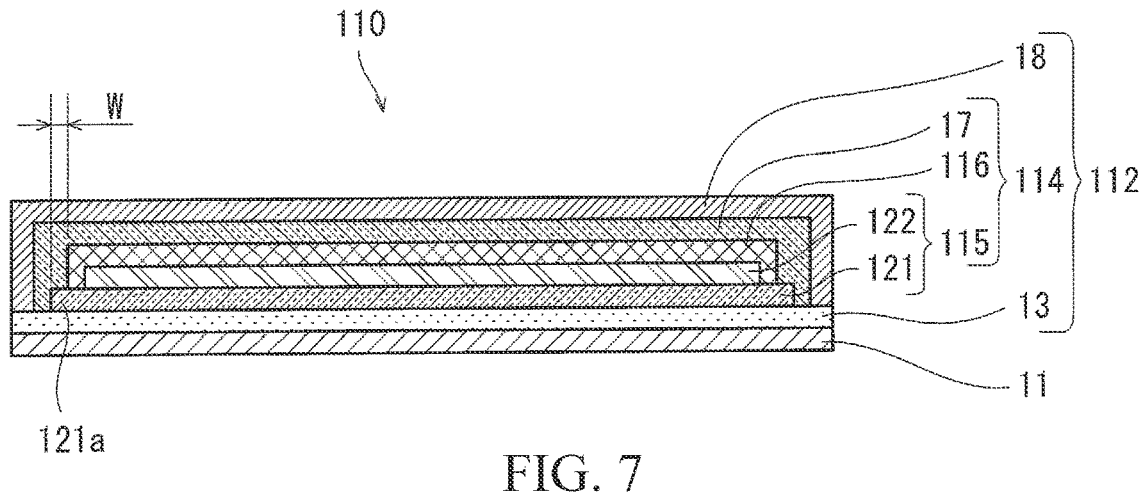
FIG. 7 is a diagram showing the water transfer sheet according to Embodiment 2 and corresponding to FIG. 1.

FIG. 7 is a diagram showing a water transfer sheet 110 according to Embodiment 2 and corresponding to FIG. 1. The same reference signs are used for the same components as in Embodiment 1, and the repetition of the same explanation is avoided. As shown in FIG. 7, a sticking layer 115 and a design layer 116 in the water transfer sheet 110 of Embodiment 2 are respectively different in configuration from the sticking layer 15 and the design layer 16 in the water transfer sheet 10 of Embodiment 1. It should be noted that the base sheet 11, the adhesive layer 13, the clear layer 17, and the cover coat layer 18 in Embodiment 2 are the same in configuration as those in Embodiment 1.

The sticking layer 115 includes a transparent sticking layer 121 and a sticking hiding layer 122. Each of the transparent sticking layer 121 and the sticking hiding layer 122 has a function of giving the sticking property with respect to the base 9. The transparent sticking layer 121 and the sticking hiding layer 122 are formed by screen printing. The transparent sticking layer 121 is a transparent resin film adjacently laminated on the adhesive layer 13. The sticking hiding layer 122 is a non-transparent resin film laminated on the transparent sticking layer 121 so as to be adjacent to a side where the design layer 116 is provided. The transparent sticking layer 121 is only required to be transparent to such a degree that the presence of the transparent sticking layer 121 is inconspicuous when the transparent sticking layer 121 is being stuck to the base 9. The sticking hiding layer 122 is formed to be more non-transparent than the transparent sticking layer 121. More specifically, in order to improve a color developing property of the design layer 116, the sticking hiding layer 122 has a function which does not transmit the surface color of the base 9. For example, the sticking hiding layer 122 has a gray color.

In the present embodiment, the transparent sticking layer 121 and the sticking hiding layer 122 are laminated such that the transparent sticking layer 121 is located closer to the base sheet 11 than the sticking hiding layer 122. The transparent sticking layer 121 is larger in area than each of the design layer 116 and the sticking hiding layer 122. The transparent sticking layer 121 includes a protruding portion 121a which protrudes outward beyond an end edge of the design layer 116 in the direction vertical to the laminating direction. The transparent sticking layer 121 protrudes outward beyond an end edge of the sticking hiding layer 122 in the direction vertical to the laminating direction. In the direction vertical to the laminating direction, the sticking hiding layer 122 is arranged at an inside of the design layer 116 and is smaller in area than the design layer 116. In other words, the design layer 116 covers the entire sticking hiding layer 122. The design layer 116 covers a main surface of the sticking hiding layer 122, covers and hides the end edge of the sticking hiding layer 122, and reaches the transparent sticking layer 121. The other configurations and manufacturing procedure are the same as those in Embodiment 1.

According to Embodiment 2, since the sticking hiding layer 122 is interposed between the base 9 and the design layer 116, the color developing property of the design layer 116 can be satisfactorily maintained. In addition, since the sticking hiding layer 122 is smaller in area than the transparent sticking layer 121, and the design layer 116 protrudes outward beyond the end edge of the sticking hiding layer 122, the end edge portion of the sticking hiding layer 122 can be prevented from being directly seen from an outside. Moreover, since the sticking layer 115 includes the transparent protruding portion 121a which protrudes outward beyond the end edge of the design layer 116, both the sticking property and the appearance can be realized.

Embodiment 3

Figure 8:
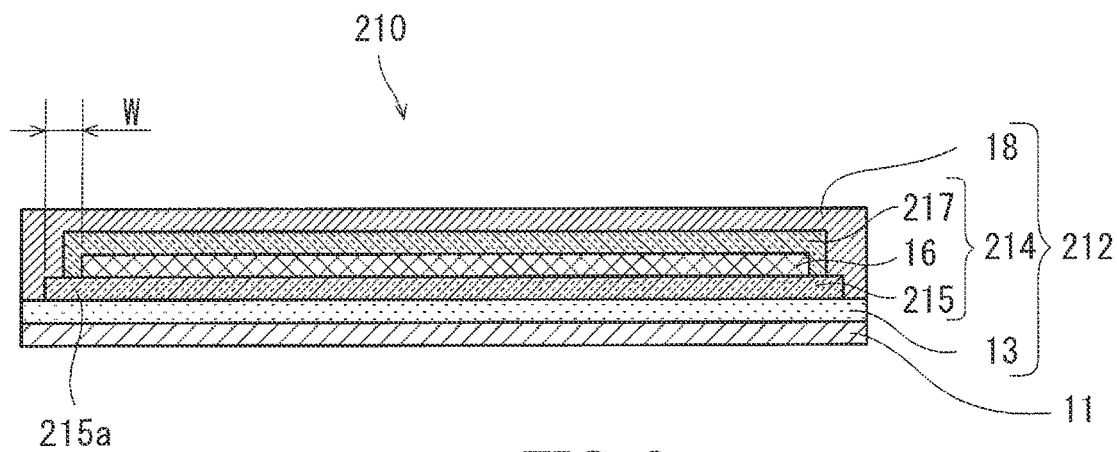
FIG. 8 is a diagram showing the water transfer sheet according to Embodiment 3 and corresponding to FIG. 1.

FIG. 8 is a diagram showing a water transfer sheet 210 according to Embodiment 3 and corresponding to FIG. 1. The same reference signs are used for the same components as in Embodiment 1, and the repetition of the same explanation is avoided. As shown in FIG. 8, a sticking layer 215 and a clear layer 217 in a sheet main body layer 214 of a transfer body 212 of the water transfer sheet 210 of Embodiment 3 are respectively different in configuration from the sticking layer 15 and the clear layer 17 in the water transfer sheet 10 of Embodiment 1. It should be noted that the base sheet 11, the adhesive layer 13, the design layer 16, and the cover coat layer 18 are the same in configuration as those in Embodiment 1.

The sticking layer 215 includes a protruding portion 215a which protrudes outward beyond the design layer 16 in the direction perpendicular to the laminating direction. The clear layer 217 protrudes outward beyond the design layer 16 in the direction perpendicular to the laminating direction and covers the end edge of the design layer 16. The protruding portion 215a of the sticking layer 215 protrudes outward beyond the clear layer 217 in the direction perpendicular to the laminating direction. It should be noted that in the direction perpendicular to the laminating direction, the end edge of the sticking layer 215 may be located at the same position as the end edge of the clear layer 217. Even in this configuration, both the sticking property and the appearance can be realized in the water transfer sheet 210.

Embodiment 4

Figure 9:
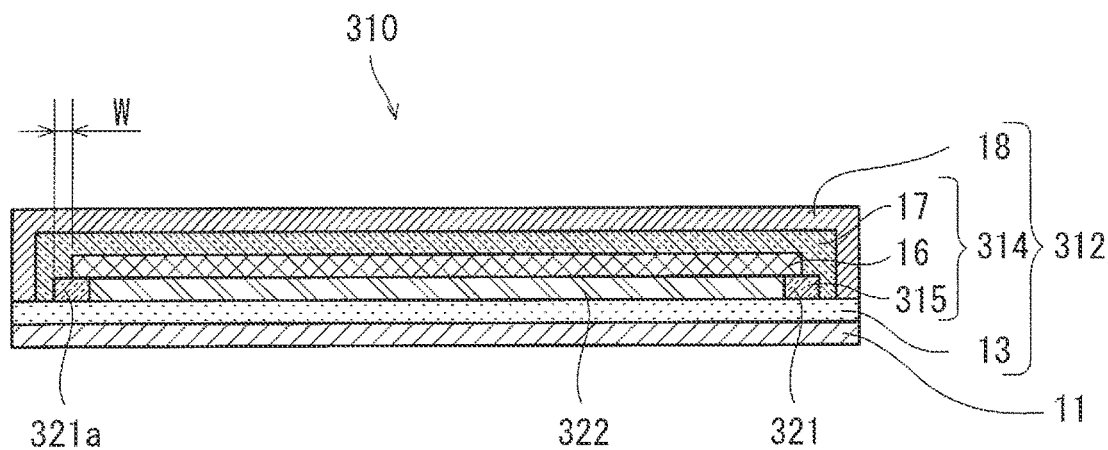
FIG. 9 is a diagram showing the water transfer sheet according to Embodiment 4 and corresponding to FIG. 1.

FIG. 9 is a diagram showing a water transfer sheet 310 according to Embodiment 4 and corresponding to FIG. 1. The same reference signs are used for the same components as in Embodiment 1, and the repetition of the same explanation is avoided. As shown in FIG. 9, a sticking layer 315 of a sheet main body layer 314 of a transfer body 312 in the water transfer sheet 310 of Embodiment 4 is different in configuration from the sticking layer 15 in the water transfer sheet 10 of Embodiment 1. It should be noted that the base sheet 11, the adhesive layer 13, the design layer 16, the clear layer 17, and the cover coat layer 18 are the same in configuration as those in Embodiment 1.

The sticking layer 315 includes a sticking hiding layer 322 and a transparent sticking layer 321 having a shape (for example, a ring shape) surrounding a peripheral edge of the sticking hiding layer 322. The transparent sticking layer 321 is continuous with an end edge of the sticking hiding layer 322. The sticking hiding layer 322 and the transparent sticking layer 321 exist at the same height level. For example, the thickness of the transparent sticking layer 321 is the same as the thickness of the sticking hiding layer 322.

The sticking hiding layer 322 is located at an inside of the design layer 16 in the direction perpendicular to the laminating direction. In a plan view, the sticking hiding layer 322 is included in the design layer 16. The transparent sticking layer 321 includes a protruding portion 321a which protrudes outward beyond the design layer 16 in the direction perpendicular to the laminating direction. Even in this configuration, both the sticking property and the appearance can be realized in the water transfer sheet 310. Moreover, the thickness of the sticking layer 315 including the transparent sticking layer 321 and the sticking hiding layer 322 can be prevented from increasing.

Embodiment 5

Figure 10:
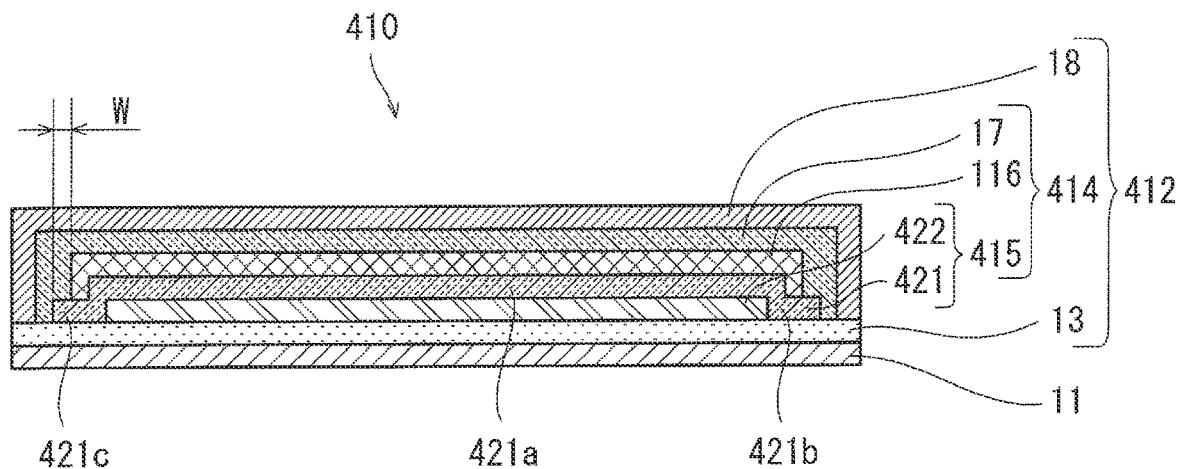
FIG. 10 is a diagram showing the water transfer sheet according to Embodiment 5 and corresponding to FIG. 1.

FIG. 10 is a diagram showing a water transfer sheet 410 according to Embodiment 5 and corresponding to FIG. 1. The same reference signs are used for the same components as in Embodiment 1 or 2, and the repetition of the same explanation is avoided. As shown in FIG. 10, a sticking layer 415 of a sheet main body layer 414 of a transfer body 412 in the water transfer sheet 410 of Embodiment 5 is different in configuration from the sticking layer 115 in the water transfer sheet 110 of Embodiment 2. It should be noted that the base sheet 11, the adhesive layer 13, the design layer 116, the clear layer 17, and the cover coat layer 18 are the same in configuration as those in Embodiment 2.

The sticking layer 415 includes: a sticking hiding layer 422 laminated on the adhesive layer 13; and a transparent sticking layer 421 laminated on the sticking hiding layer 422 from a side where the design layer 116 is provided. The sticking hiding layer 422 is located at an inside of the design layer 116 in the direction perpendicular to the laminating direction. In a plan view, the sticking hiding layer 422 is included in the design layer 116.

The transparent sticking layer 421 protrudes outward beyond the sticking hiding layer 422 in the direction perpendicular to the laminating direction and covers an end edge of the sticking hiding layer 422. To be specific, the transparent sticking layer 421 includes: an upper-layer portion 421a laminated on the sticking hiding layer 422; and a lower-layer portion 421b connected to the upper-layer portion 421a to form a level difference and protruding outward at the same height level as the sticking hiding layer 422. The lower-layer portion 421b of the transparent sticking layer 421 includes a protruding portion 421c which protrudes outward beyond the design layer 116 in the direction perpendicular to the laminating direction. The design layer 116 covers an end edge of the upper-layer portion 421a of the transparent sticking layer 421 and reaches the lower-layer portion 421b of the transparent sticking layer 421. Even in this configuration, both the sticking property and the appearance can be realized in the water transfer sheet 410.

What is claimed is:
1. A transfer sheet comprising:
a base sheet; and a transfer body laminated on the base sheet,
the transfer body including:
- a liquid-soluble adhesive layer laminated on the base sheet, and
- a liquid-insoluble sheet main body layer laminated on the liquid-soluble adhesive layer, the sheet main body layer including
- a sticking layer adjacently laminated on the adhesive layer at an opposite side of the base sheet and having a function of sticking the sheet main body layer to a sticking target object and
- a design layer adjacently laminated on the sticking layer at an opposite side of the adhesive layer, the sticking layer including a protruding portion protruding outward beyond an end edge of the design layer, the protruding portion being transparent.

2. The transfer sheet according to claim 1, wherein the protruding portion of the sticking layer has such a shape as to surround the end edge of the design layer along the end edge of the design layer.

3. The transfer sheet according to claim 1, wherein the protruding portion of the sticking layer has a protruding width of 1 mm or more from the end edge of the design layer.

4. The transfer sheet according to claim 1, wherein the entire sticking layer is transparent.

5. The transfer sheet according to claim 1, wherein:
the sticking layer includes
- a transparent sticking layer adjacently laminated on the adhesive layer and
- a non-transparent sticking hiding layer laminated on the transparent sticking layer so as to be adjacent to a side where the design layer is provided; and the sticking hiding layer is arranged at an inside of the end edge of the design layer.

6. The transfer sheet according to claim 1, further comprising a clear layer that covers the entire design layer and contacts at least the protruding portion of the sticking layer.

7. The transfer sheet according to claim 1, wherein:
- a thickness of the transfer body is more than 10 µm and less than 100 µm; and
- a thickness of the design layer is more than 1 µm and less than 50 µm.

8. The transfer sheet according to claim 1, wherein the sticking layer includes a transparent portion sandwiched directly between the end edge of the design layer and the liquid-soluble adhesive layer.

9. The transfer sheet according to claim 1, wherein the protruding portion of the sticking layer protrudes outward beyond a clear layer in a direction perpendicular to a laminating direction.

10. The transfer sheet according to claim 1, wherein:
the sticking layer includes a sticking hiding layer and a transparent sticking layer having a shape surrounding a peripheral edge of the sticking hiding layer,
the sticking hiding layer is included in the design layer in a plan view, and
the transparent sticking layer includes the protruding portion.

11. The transfer sheet according to claim 1, wherein:
the sticking layer includes a sticking hiding layer laminated on the adhesive layer and a transparent sticking layer laminated on the sticking hiding layer,
the transparent sticking layer protrudes outward beyond the sticking hiding layer in a direction perpendicular to a laminating direction and covers an end edge of the sticking hiding layer, and
the transparent sticking layer includes the protruding portion.

* * * * *